April 5, 1927.

C. E. STARR 1,623,213

TRANSMISSION GEARING

Filed Nov. 19, 1923     3 Sheets-Sheet 1

Inventor
CHARLES E. STARR.

WITNESS.

By White Prost & Evans
his Attorneys.

April 5, 1927.  1,623,213
C. E. STARR
TRANSMISSION GEARING
Filed Nov. 19, 1923   3 Sheets-Sheet 2

Inventor
CHARLES E. STARR.

WITNESS.

By White Prost & Evans
Attorneys

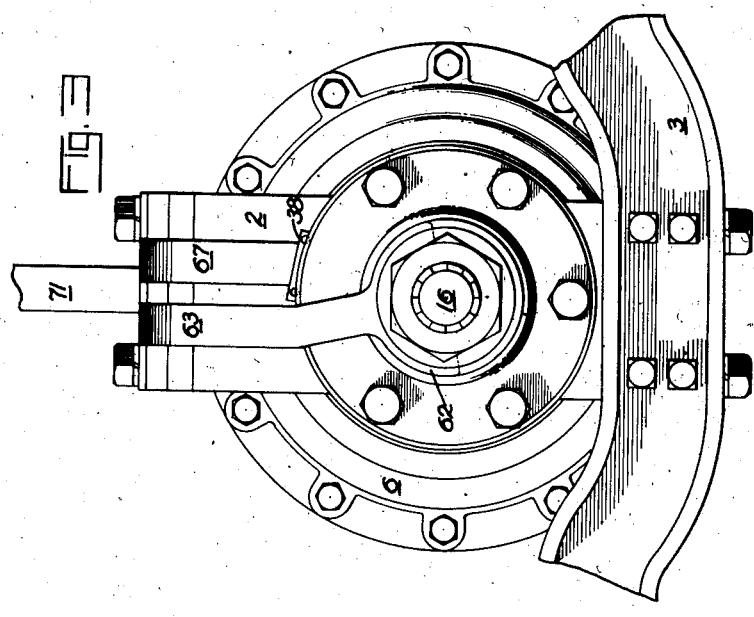
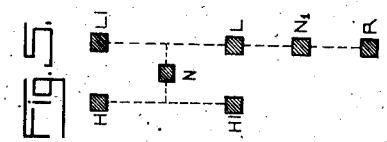
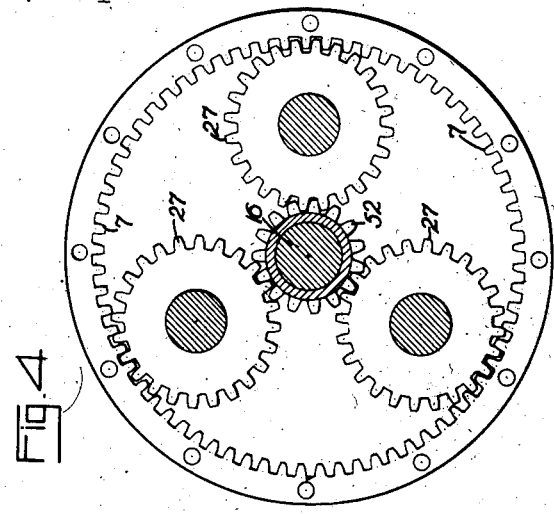

Patented Apr. 5, 1927.

1,623,213

UNITED STATES PATENT OFFICE.

CHARLES E. STARR, OF OAKLAND, CALIFORNIA, ASSIGNOR TO PERFECTO GEAR DIFFERENTIAL COMPANY, OF OAKLAND, CALIFORNIA, A CORPORATION OF WASHINGTON.

TRANSMISSION GEARING.

Application filed November 19, 1923. Serial No. 675,474.

My invention relates to transmission mechanisms particularly for power driven vehicles and one of the objects of the invention is to provide a speed change device characterized by a substantially noiseless operation.

Another object of the invention is to provide a transmission mechanism in which the transition from one combination of gears to another combination of gears may be effected silently, at any speed.

Another object of the invention is to provide a transmission gearing in which the gears connecting the driving and driven elements are always in mesh.

My invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims:

Referring to the drawings:

Figure 3 is an end elevation of my transmission, the direction of the view being indicated by the arrow in Figure 1.

Figure 4 is a vertical sectional view, the plane of section being indicated by the line 4—4 of Figure 1.

Figure 5 is a diagrammatical view indicating the movements of the gear shifting lever.

Figure 1:
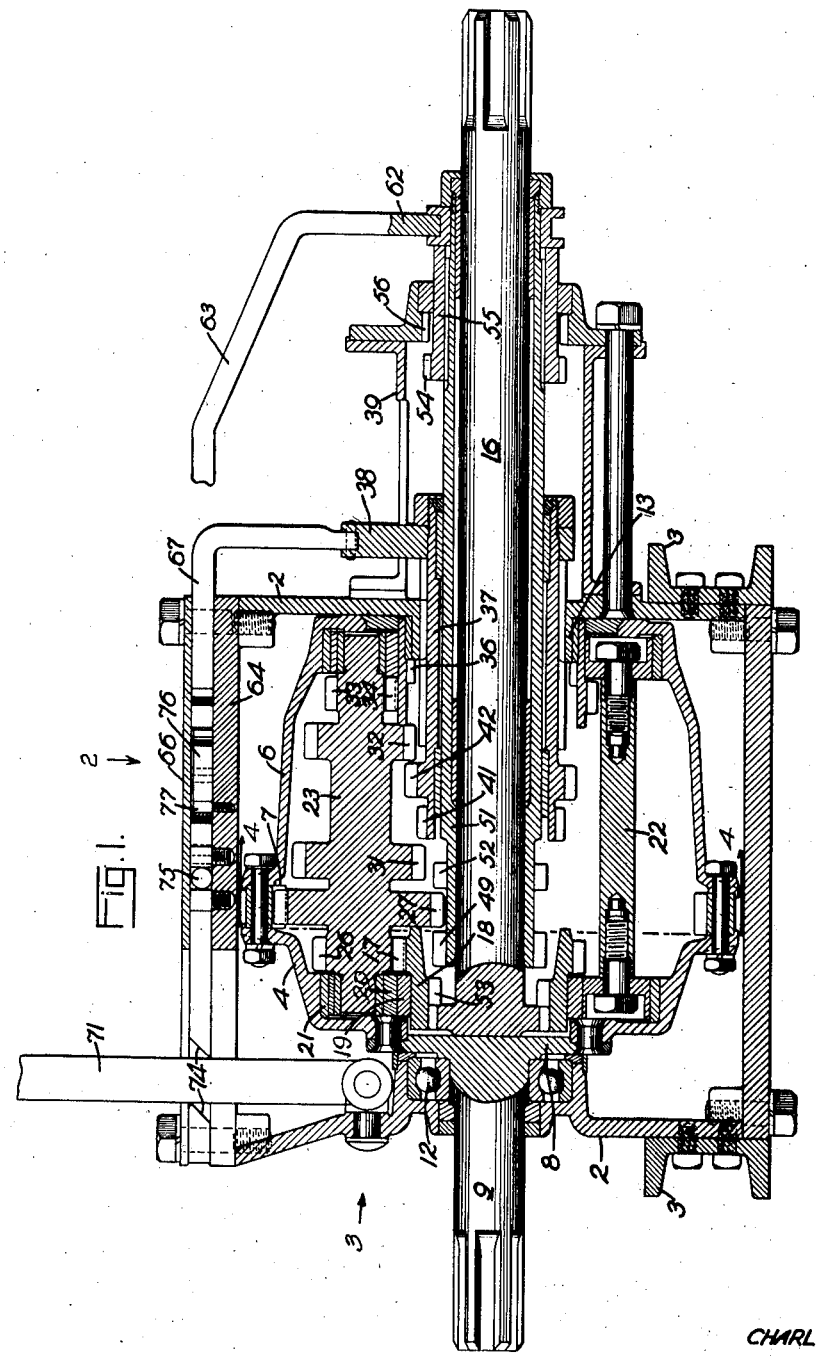
Figure 1 is a side elevation, partly in vertical section, showing my transmission.

In terms of broad inclusion, my invention comprises a driving and a driven shaft with a jack shaft parallel to the axes of the driving and driven shafts, and mounted for orbital and axial rotation. The jack shaft is geared to both the driving and the driven shaft by suitable gears which are always in mesh. If the jack shaft were prevented from orbital movement, the speed of transmission from the driving to the driven shaft would, of course, be fixed by the proportions of the gears forming the connection, but in my transmission mechanism, the jack shaft is never in fixed position, but during the operation of the device, is always in orbital movement, either with or without axial movement. That is to say, the movement of the jack shaft is always either planetary or lunar. Since the effective peripheral speed of the driving gear on the jack shaft or the actual peripheral speed of the driven gear on the driven shaft may be considered as the algebraic sum of the orbital and axial velocities, I am able to effect changes of speed of the driven shaft without disengaging the connecting gears by the use of means for varying these factors, and I accomplish this by the use of different sizes of planetary gears on the jack shaft, each of which is adapted to be controlled by a center or control gear.

Means are provided for engaging any one of the center gears with its planet gear, and while so engaged preventing the center gear from rotation to effect planetary movement of the jack shaft at a characteristic speed, or for interlocking one of the center gears with the driven shaft so that lunar motion of the jack shaft results. With lunar motion of the jack shaft there is no relative motion between the gears and all of the parts revolve as one, so that the effect is that of a direct connection between driving and driven shafts. When one of the center gears is prevented from rotation, there is both orbital and axial rotation of the jack shaft, which then transmits motion at a velocity in accordance with the proportions of the gears involved.

I provide three planetary gears on the jack shaft, of different sizes, and each with a greater number of teeth than the driving gear on the jack shaft. These three gears are involved in the four forward speeds possible to attain with my transmission. I also provide on the jack shaft, a planet gear having a smaller number of teeth than the driving gear thereon. When the center gear in mesh with this small gear is held against rotation, reverse movement of the driven shaft results, and this is true without a change in the direction of the axial or the orbital rotation of the jack shaft.

The proportions of the various parts are such as to give selective transmission substantially in the following ratios: forward, 1 to 1, 1.5 to 1, 3 to 1, 4.5 to 1, and in reverse 5.5 to 1.

More particularly, my transmission mechanism comprises a frame 2 supported on the chassis of the vehicle by any suitable means such as the cross pieces 3, and in which is journaled a cylindrical housing, preferably formed of the two parts 4 and 6 secured by suitable bolts on each side of a ring gear 7. One side of the housing part 4 is fixed to the flange 8 on the driving shaft 9 and a heavy duty ball bearing 12 is interposed between the shaft and the frame, at this point. The bearing at the opposite end is subjected to less stress and therefore it may be of simpler type, such as a plain bearing provided by the flange 13.

The driven shaft 16 is in axial alinement with the driving shaft and extends into the housing closely adjacent the end of the driving shaft where it is splined into the driven gear 17, the hub 18 of which is journaled within one of the end members 19 of a frame or cage which in turn is journaled within the housing as shown in Figure 1, for rotation concentric with the axis of the driven shaft. A wear ring 20 is interposed between the hub and the frame, and a similar ring 21 is interposed between the frame and the housing. The two ends of the frame or cage are connected by the rods 22, of which there are preferably three, spaced at 120° intervals. Journaled in the cage, also at 120° intervals, and between the rods, are the jack shafts 23 which are, therefore, capable of axial rotation in the cage and also orbital rotation about the driven shaft when the cage rotates. Each jack shaft is provided with a fixed gear 26 in mesh with the gear 17 and of which it is the driving gear. Each jack shaft is also provided with a fixed gear 27 in mesh with the ring gear 7. The jack shaft is thus geared to both driving and driven shaft, and the gears 7 and 27, and 26 and 17 are always in mesh.

Also fixed on each jack shaft is a plurality of planet gears 31, 32 and 33. While the gear 27 is the driven gear on the jack shaft it also functions as a planet gear and the four planet gears 27, 31, 32 and 33 are formed with a successively smaller number of teeth, the first three having more teeth than the driving gear 26, but the last gear 33, having a less number of teeth than the gear 26. The gear 33 is utilized in effecting reverse rotation of the driven shaft and the others are utilized in securing forward rotation.

Means are provided for controlling the orbital and axial speeds of the jack shafts so that the effective peripheral speed of the driving gear 26 may be altered to give the desired velocity and direction to the rotation of the driven shaft 16. Meshing with the set of gears 33 is an externally toothed ring gear 34 arranged concentric with the axis of the driven shaft, as shown in Figure 1, and provided with an annular series of inwardly extending clutch teeth or members, 36. This gear idles without function except when the transmission is in reverse, when it forms the active rim of the control or center gear for the planet gears 33.

Slidably but non-rotatably mounted in the frame is a sleeve 37 carrying the operating flange or finger 38 on its outer end, the flange extending upwardly thru a suitable groove formed in the bracket 39. On its inner end, the sleeve 37 is provided with two series of gear teeth comprising the center or control gears 41 and 42, the first being adapted to mesh with the planet gears 31 and the last being adapted to mesh with the planet gears 32. The gear 42 is also adapted to engage the clutch teeth of the gear 34, and at such time the two together form the control or center gear for the gears 33, the active rim being the gear 34 and the gear 42 being inactive as a gear since it forms a hub or support for the active portion of the whole.

Thus by moving the sleeve 37 axially, any one of the sets of gears 31, 32 and 33 may be engaged by its control or center gear, and when so engaged, rotation of the housing 4—6 causes planetary movement of the jack shafts, since the center gear is non-rotatable. During such planetary movement, the axial and orbital velocities are determined by the proportions of the gears engaged, and the resultant effective speed of the driving gear 26 is communicated to the driven shaft 16 either in forward or reverse rotation as the case may be. With parts as shown in Figure 1, the gears 41 and 42 are in one of their two neutral positions, the other neutral position occurring just prior to the engagement of the gear 42 in the teeth 36. Engagement of the gear 41 with the gear 31 produces low intermediate speed; engagement of the gear 42 with the gear 32 gives low speed, and holding the gear 34 stationary gives still lower speed and in the opposite direction.

The large planet gear 27 is also provided with a center or control gear 49 formed on the sleeve 51, journaled on the driven shaft 16, as shown. Formed also on the sleeve 51 are clutch teeth 52 and these teeth are spaced axially from the teeth 49, so that the two series of teeth may lie on the two sides of the gear 27, as shown in Figure 1, in which position the transmission is in one of several neutral positions. If desired the teeth 49 and 52 may be combined into one wide tooth which is always in engagement with the gear 27. I prefer however, to make them as shown and described. Like the other center or control gears, the gear 49 is adapted to be shifted axially to one side or the other.

When shifted to the left (of Figure 1) the teeth 52 enter into engagement with the teeth of the gear 27, and the gear 49 engages the teeth 53 formed on the driven gear 17, thus interlocking the gear 49 with the driven shaft. When so engaged, axial motion of the jack shaft is obviously impossible and the parts are locked together so that housing, jack shaft and gears revolve as one about the axis of the shaft 16. This is the high speed combination of the transmission.

When the gear 49 is moved to the right (of Figure 1) it meshes with the gear 27 shortly before the teeth 54, fixed on the collar 55 on the outer end of the sleeve 51, engage the teeth 56, carried on the fixed bracket 39, thus holding the sleeve 51 stationary, and forcing planetation of the jack shafts by operation of the gear 27. This imparts to the driven shaft 16 high intermediate speed.

With the gear 49 moved to the left to engage teeth 53, the sleeve 51 is rotated at the same speed as the driven shaft 16. The collar 55 is therefore provided with an annular groove in which a yoke arm 62 bears. This yoke arm extends upwardly in the bar 63 which is provided with a sliding bearing on top of the frame between the frame member 64 and cover plate 66. Side by side with the bar 63 is a bar 67 which, as shown, is engaged in the operating flange or finger 38 of the sleeve 37.

Figure 2:
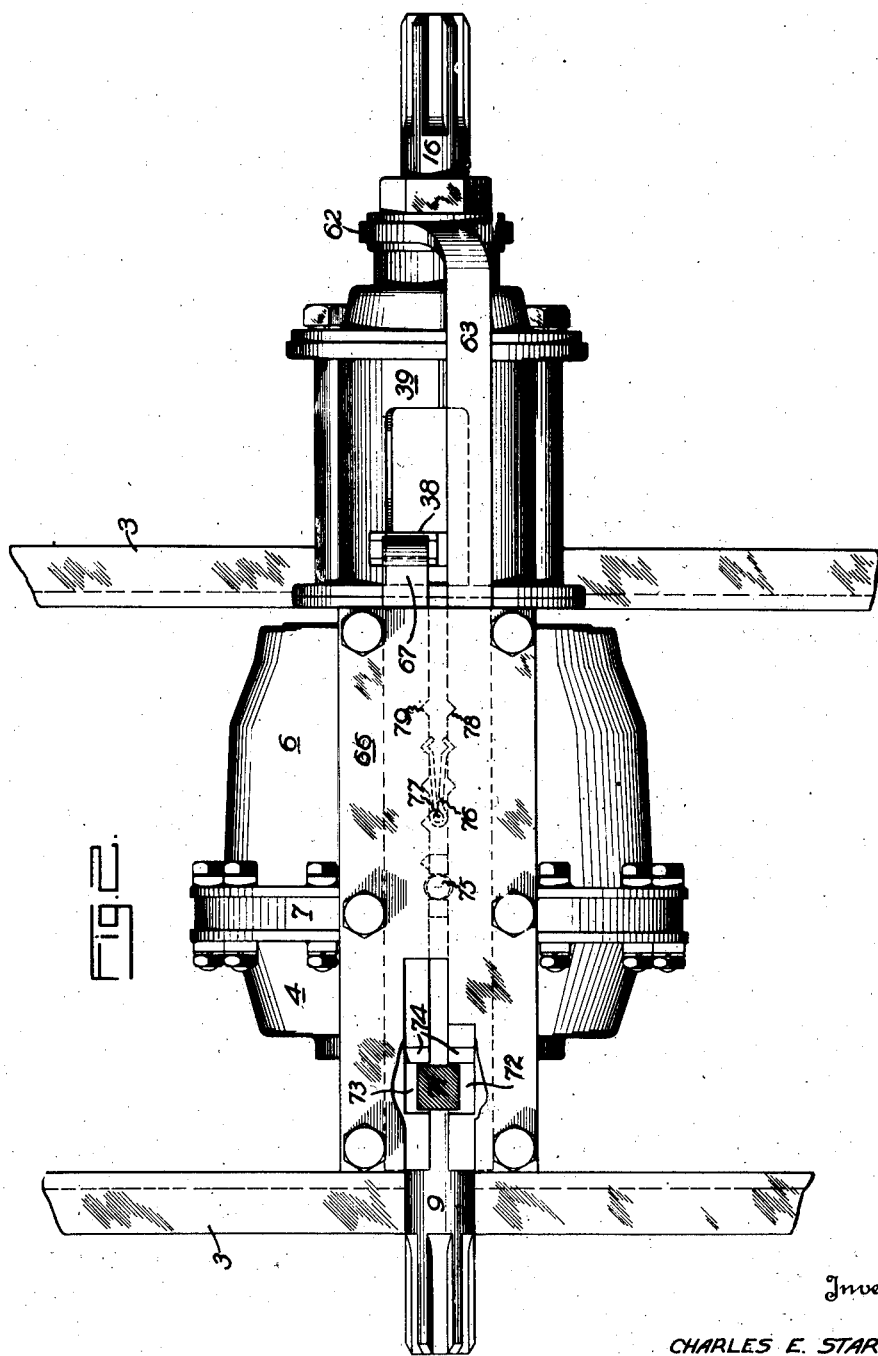
Figure 2 is a plan view of my transmission, the direction of the view being indicated by the arrow in Figure 1.

Means are provided for moving the bars 63 and 67 selectively to effect the desired engagements and resultant gear combinations. Pivotally mounted on the frame 2 is an operating lever 71. The pivotal mounting of the lever, as shown, is of such character as to permit movement of the lever back and forth longitudinally of the driving and driven shaft, or transversely in a direction perpendicular to such longitudinal motion. Each of the bars 63 and 67 is provided with notches 72 and 73 respectively, and the parts are so arranged that the operating lever 71 normally engages in both notches as shown in Figure 2, or may be moved laterally to engage fully in either notch, at which time it is out of engagement with the other notch. The edges 74 of the notches are beveled, as shown, to permit the rocking movement of the lever therein. The bars are also provided with opposed curved notches in which a locking ball 75 is adapted to seat, the proportions of the parts being such that the ball will permit the movement of either bar, but not both bars at the same time.

As a result of this structure, the operating lever 71 may be moved laterally to engage the bar 63, which may then be moved longitudinally to move the sleeve 51 to any one of its three positions corresponding to high speed, neutral and high intermediate speed. On the other hand, the lever 71 may be shifted to the opposite side to engage the bar 67 which may then be moved longitudinally to move the sleeve 37 to any one of its five positions corresponding to low intermediate, neutral, low, neutral and reverse.

The bars are held in these various positions, and such positions are indicated during the movement of the bars, by means of a bent spring 76, carried on a stud 77, and so formed as to engage notches 78 and 79 formed in the adjacent edges of the bars 63 and 67 respectively. As a bar is moved, the spring falls into a notch, and offers slight resistance to further movement, so that the extent of the required movement is clearly indicated. Since in operation there is little or no tendency toward disengagement of the clutch members, such resilient engagement, as is provided by the spring 76, is found to be ample to keep the parts in position.

I find that the various engagements may be effected at will while the parts are revolving at full speed, without the slightest danger of failure, or appreciable resistance or noise, but if desired, the adjacent faces of the teeth of the gears 31 and 41, and of the teeth 54 and 56, may be staggered, as shown in Figure 2 of my copending application, Serial No. 622,019.

*Operation.*

*High speed.*—The operating lever 71 is rocked to the left from neutral position N, Figure 5, and pushed forward to position H. This activates bar 63 and connected sleeve 51 so that the teeth 52 engage the gear 27 and the gear 49 interlocks in the teeth 53 and with the driven shaft.

*High intermediate.*—The operating lever is pulled straight back to position H. I. This meshes gears 49 and 27 and clutch members 54 and 56, so that gear 27 is forced to planetate about the gear 49.

*Low intermediate.*—The operating lever is returned to neutral position N, then rocked to the right to disengage bar 63 and engage the bar 67, and then pushed forward to position L. I. This effects the sliding of the sleeve 37 so that gears 41 and 31 are engaged, forcing planetation about the gear 41.

*Low.*—The operating lever is pulled straight back to position L. This engages the gears 42 and 32, forcing planetation about the gear 42.

*Reverse.*—The operating lever is pulled still further back, thru another neutral position $N_1$, to position R. This carries the gear 42 past the gear 32, thru neutral and into engagement with the teeth 36. The combined gear 34—42 being non-rotatable forces planetation of the gears 33, therearound, and because the gears 33 have a less number of teeth than the gears 26, the driven gear 17 and shaft 16 are turned in reverse direction altho both the orbital and axial rotation of the gears 33 are unchanged in direction.

I claim:

1. In a transmission gearing, a rotatable closed housing, a driving shaft connected for rotation with said housing, a driven shaft extending into said housing, a jack shaft within said housing and geared to both the housing and the driven shaft, a plurality of planet gears fixed on said jack shaft, a non-rotatable center gear adapted to mesh with each planet gear, and means for optionally engaging any center gear with its planet gear.

2. In a transmission a driven and a driving shaft, a jack shaft geared to said driven shaft and mounted for orbital and axial rotation, a planet gear fixed on said jack shaft, a ring gear in mesh with said planet gear and fixed for rotation with said driving shaft, a fixed element, a center gear, and means for shifting said center gear axially to mesh with said planet gear and to lock the center gear with said fixed element or with said driven shaft.

3. In a transmission, a driven and a driving shaft, a jack shaft, a plurality of gears fixed on said jack shaft, a gear fixed for rotation with said driving shaft and in mesh with one of said jack shaft gears, a driven gear fixed for rotation with said driven shaft and in mesh with one of said jack shaft gears, a center gear adapted to mesh with each of the remaining jack shaft gears, a fixed element, means for engaging any one of said center gears with said fixed element, and selective means for shifting one of said center gears into mesh with its jack shaft gear and concurrent engagement with said driven gear or for enmeshing any one of said center gears with its jack shaft gear when said center gear is engaged with said fixed element.

4. In a transmission gearing, a driving shaft, a driven shaft, a jack shaft mounted for axial and orbital rotation and geared to said driven shaft, a ring gear fixed for rotation with said driving shaft, a plurality of planet gears fixed on said jack shaft one of said planet gears also being in mesh with said ring gear, a center gear associated with each planet gear, selective means for meshing any center gear with its planet gear or interlocking one of said center gears with the driven shaft, and means for preventing rotation of the center gears when meshed with the planet gears.

5. In a transmission gearing, driving and driven shafts, a jack shaft geared to both said shafts, a plurality of planet gears on said jack shaft, a plurality of center gears adapted to be meshed with said planet gears, and selective means for engaging any center gear with its planet gear or engaging one of said center gears with its planet gear and said driven shaft.

6. In a transmission gearing, a driving and a driven shaft, a jack shaft geared to said driven shaft, a planet gear on said jack shaft, a gear on said driving shaft in mesh with said planet gear, a center gear adapted to mesh with said planet gear, a fixed element, and selective means for engaging said center gear with said fixed element or with said driven shaft while in mesh with said planet gear.

7. In a transmission gearing a driving and a driven shaft, a jack shaft geared to said driven shaft, a planet gear on said jack shaft, a gear on said driving shaft in mesh with said planet gear, a fixed element, a center gear adapted to mesh with said planet gear and provided with clutch members, complementary clutch members on said fixed element and on said driven shaft, and means for shifting said center gear axially into mesh with its planet gear and to engage either set of complementary clutch members.

8. In a transmission gearing, a driving and a driven shaft a jack shaft geared to said driven shaft, a planet gear on said jack shaft, a gear on said driving shaft in mesh with said planet gear, a center gear adapted to mesh with said planet gear and provided with clutch members, a fixed element, complementary clutch members on said fixed element and on said driven shaft, means for shifting said center gear axially into mesh with its planet gear and to engage either set of complementary clutch members, a plurality of other planet gears of different sizes on said jack shaft, a center gear adapted to mesh with each of said other planet gears a sleeve on which said last named center gears are fixed and slidably non-rotatably engaged with said fixed element. and means selectively associated with said shifting means for shifting said sleeve to engage a center gear with any of said plurality of planet gears.

9. In a transmission bearing, a jack shaft, a driven shaft, a driving gear on said jack shaft, a driven gear on said driven shaft in mesh with said driving gear, a plurality of planet gears having a greater number of teeth than said driving gear and fixed on said jack shaft, a planet gear having a smaller number of teeth than said driving gear and fixed on said jack shaft, a plurality of center gears concentric with said driven gear and adapted to mesh, one with each planet gear, a driving shaft geared to said jack shaft, and selective means for engaging one of the center gears with its planet gear and simultaneously interlocking it with said driven shaft or engaging any one of said center gears with its planet gear and simultaneously preventing rotation of the engaged center gear.

10. In a transmission gearing, a driving and a driven shaft, a jack shaft geared to both driven and driving shafts, a planet gear on said jack shaft, a ring gear in mesh with said planet gear and provided with clutch teeth, a slidably non-rotatably mounted sleeve having teeth complementary to said clutch teeth, and means for shifting said sleeve to engage or disengage said complementary clutch teeth.

11. In a transmission gearing, a driving and a driven shaft, a jack shaft geared to both said shafts, a plurality of planet gears on said jack shaft, a ring gear in mesh with one of said planet gears and provided with clutch teeth, a slidably non-rotatably mounted sleeve, a center gear on said sleeve adapted to mesh with one of said planet gears or engage in said clutch teeth, and means for shifting said sleeve.

12. In a transmission gearing, a driving and a driven shaft, a jack shaft geared to both said shafts, a plurality of planet gears on said jack shaft, a ring gear in mesh with one of said planet gears and provided with clutch teeth, a slidably non-rotatably mounted sleeve, a center gear on said sleeve adapted to mesh with one of said planet gears or engage in said clutch teeth, a second center gear on said sleeve adapted to mesh with one of said planet gears, and means for shifting said sleeve to mesh any center gear with its associated planet gear or engage one of said center gears in said clutch teeth.

13. In a transmission gearing, a fixed frame, a driving shaft terminating in a housing journaled in said frame, a cage journaled in said housing, a driven shaft alined with said driving shaft and journaled in said cage, a jack shaft journaled in said cage for axial and orbital rotation and geared to both housing and driven shaft, and selective means for effecting orbital rotation of said jack shaft with or without axial rotation.

14. In a transmission gearing, a closed housing, a driving shaft connected for rotation with said housing, a cage enclosed by and journaled in said housing, a driven shaft alined with said driving shaft and journaled in said cage, a jack shaft journaled in said cage and geared to both housing and driven shaft, and selective means for orbitally rotating the jack shaft at different speeds.

15. In a transmission gearing, a closed housing, a driving shaft connected for rotation with said housing, a cage enclosed by and journaled in said housing, a driven shaft alined with said driving shaft and journaled in said cage, a jack shaft journaled in said cage and geared to both housing and driven shaft, a plurality of planet gears on said jack shaft, a plurality of center gears adapted to be meshed with said planet gears, and selective means for engaging any center gear with its planet gear.

In testimony whereof, I have hereunto set my hand.

CHARLES E. STARR.